US010695674B2

(12) United States Patent
Zhang (10) Patent No.: US 10,695,674 B2
(45) Date of Patent: Jun. 30, 2020

(54) INFORMATION PROCESSING METHOD AND APPARATUS, STORAGE MEDIUM AND ELECTRONIC DEVICE (71) Applicant: Jingya Zhang, Zhejiang (CN)

(72) Inventor: Jingya Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/013,968

(22) Filed: Jun. 21, 2018

(65) Prior Publication Data
US 2019/0030431 A1 Jan. 31, 2019

(30) Foreign Application Priority Data

Jul. 27, 2017 (CN) .......................... 2017 1 0623126

(51) Int. Cl.
A63F 13/533 (2014.01)
A63F 13/2145 (2014.01)
A63F 13/837 (2014.01)
A63F 13/42 (2014.01)
A63F 13/5255 (2014.01)
A63F 13/5378 (2014.01)
G06F 3/0488 (2013.01)

(52) U.S. Cl.
CPC ........ A63F 13/533 (2014.09); A63F 13/2145 (2014.09); A63F 13/42 (2014.09); A63F 13/5255 (2014.09); A63F 13/5378 (2014.09); A63F 13/837 (2014.09); G06F 3/04883 (2013.01)

(58) Field of Classification Search
None
See application file for complete search history.

(56) References Cited

U.S. PATENT DOCUMENTS

2010/0255907 A1* 10/2010 Yoro ..................... G06F 3/0482
463/31
2014/0066195 A1* 3/2014 Matsui ..................... A63F 13/42
463/30
2018/0028907 A1* 2/2018 Weng .................. A63F 13/2145
(Continued)

FOREIGN PATENT DOCUMENTS

CN 102886140 A 1/2013
CN 103530035 A 1/2014
(Continued)

Primary Examiner — Damon J Pierce
(74) Attorney, Agent, or Firm — Gang Yu (57) ABSTRACT An information processing method and apparatus, a storage medium and an electronic device are provided. The method includes that: a first touch control region is provided on a graphical user interface, and a virtual character is configured to move in a game scene according to a first touch operation received in the first touch control region; a second touch control region is provided on the graphical user interface, and when a second touch operation in the second touch control region is detected, a presented vision of the game scene on the graphical user interface is changed; and when a preset operation of the second touch operation is detected, a prompt signal selection control configured to send a prompt signal is provided, and the prompt signal includes position indication information of the game scene.

18 Claims, 9 Drawing Sheets (56) References Cited

U.S. PATENT DOCUMENTS

2018/0028916 A1\* 2/2018 Chen ..................... G06F 9/44
2018/0364802 A1\* 12/2018 Cederlund .............. G06F 3/038
2018/0373376 A1\* 12/2018 Kurabayashi ......... G06F 3/0488

FOREIGN PATENT DOCUMENTS

| CN | 105094345 A | 11/2015 |
|----|-------------|---------|
| CN | 105327506 A | 2/2016 |
| CN | 105597310 A | 5/2016 |
| CN | 105739890 A | 7/2016 |
| CN | 106975219 A | 7/2017 |

\* cited by examiner

INFORMATION PROCESSING METHOD AND APPARATUS, STORAGE MEDIUM AND ELECTRONIC DEVICE

The present disclosure claims priority of Chinese Patent Application No. 201710623126.8, filed on Jul. 27, 2017 and named after "Information Processing Method and Apparatus, Storage Medium and Electronic Device". Contents of the present disclosure are hereby incorporated by reference in entirety of the Chinese Patent Application.

TECHNICAL FIELD

The present disclosure relates to the technical field of computer interaction, and in particular to an information processing method and apparatus, storage medium and an electronic device.

BACKGROUND

Along with development of intelligent mobile terminals and game industry, a lot of mobile games with different themes emerge to meet requirements of users. Multiple players in groups for battle in games may be a core game play for many mobile games. For example, the most core game play for Multiplayer Online Battle Arena (MOBA) type mobile games is 5V5 group battle. In a process of players in groups for battle in a game, communication and cooperation among the players are crucial. Therefore, whether a convenient and rapid interaction mechanism may be provided for communication of players or not is an important influencing factor for user experiences in such a type of mobile games.

SUMMARY

At least some embodiments of the present disclosure provide an information processing method and apparatus, a storage medium and an electronic device, so as at least to partially solve a problem of inconvenience in interaction triggered by at least one prompt signal due to restrictions and shortcomings of related art.

In an embodiment of the present disclosure, an information processing method is provided by executing a software application on a processor of a mobile terminal and performing rendering a graphical user interface on a touch screen of the mobile terminal, and a content presented on the graphical user interface including a game scene and at least partially including a virtual character, the method including: providing a first touch control region on the graphical user interface, and configuring the virtual character to move in the game scene according to a first touch operation received in the first touch control region; providing a second touch control region on the graphical user interface, and configuring a presented vision of the game scene to change according to a second touch operation received in the second touch control region; detecting the second touch operation in the second touch control region, controlling the presented vision of the game scene according to the second touch operation, and when detecting a preset action of the second touch operation, generating a prompt signal selection control, the preset action including at least one of: a heavy press action and a long press action; and when detecting a preset selection operation executed on the prompt signal selection control, sending a prompt signal corresponding to the preset selection operation, and controlling the presented vision of the game scene on the graphical user interface to recover to a state before executing second touch operation, and the prompt signal includes position indication information, corresponding to an operation position of the preset action, of the game scene.

In another embodiment of the present disclosure, a game screen display control apparatus is provided by executing a software application on a processor of a mobile terminal and performing rendering a graphical user interface on a touch screen of the mobile terminal, and a content presented on the graphical user interface including a game scene and at least partially including a virtual character, the apparatus including:

a first interaction component, arranged to provide a first touch control region on the graphical user interface and configure the virtual character to move in the game scene according to a first touch operation received in the first touch control region; a second interaction component, arranged to provide a second touch control region on the graphical user interface and configure a presented vision of the game scene to change according to a second touch operation received in the second touch control region; a first detection component, arranged to detect the second touch operation in the second touch control region, control the presented vision of the game scene according to the second touch operation, and when detecting a preset action of the second touch operation, generate a prompt signal selection control, the preset action including at least one of: a heavy press action and a long press action; and a second detection component, arranged to, when detecting a preset selection operation executed on the prompt signal selection control, send a prompt signal corresponding to the preset selection operation, and control the presented vision of the game scene on the graphical user interface to recover to a state before executing second touch operation, and the prompt signal includes position indication information, corresponding to an operation position of the preset action, of the game scene.

In another embodiment of the present disclosure, a computer-readable storage medium is provided, on which a computer program is stored, the computer program being executed by a processor to implement abovementioned information processing method.

In another embodiment of the present disclosure, an electronic device is provided, which includes:

a processor; and a memory, connected with the processor and arranged to store at least one instruction executed by the processor, and the processor is arranged to execute the at least one instruction to execute abovementioned information processing method.

DETAILED DESCRIPTION

Exemplary embodiments will now be described more comprehensively with reference to the drawings. However, the exemplary embodiments may be implemented in various forms and should not be understood to be limited to embodiments elaborated herein. On the contrary, these embodiments are provided to make the present disclosure comprehensive and complete and make the concept of the exemplary embodiments delivered to those skilled in the art comprehensively. Described characteristics, structures or properties may be combined into at least one embodiment in any appropriate manner. Many specific details are provided in the following descriptions, thereby providing an adequate understanding to the embodiments of the present disclosure. However, those skilled in the art should realize that the technical solutions of the present disclosure may be implemented without at least one of the specific details, or other methods, components, materials, apparatuses, steps and the like may be adopted. Under other circumstances, well-known technical solutions are not shown or described in detail to avoid each aspect of the present disclosure being obscured.

In addition, the drawings are schematic illustrations of the present disclosure and are not always drawn to scale. The same drawing reference signs in the figures identify the same or similar parts, and thus repeated descriptions about the same drawing reference signs are omitted.

In the related art, a human-computer interaction design for a player to send a player communication signal mainly includes one of the following manners.

At a first manner, the player communication signal is sent in a text input manner. Since text input may interrupt an operation in a game, this manner is suitable for a player in a non-battle state.

At a second manner, a preset signal is sent by providing a specific control. For example, a gather signal sending button is provided, and the gather signal sending button is configured for a player to send a gather prompt signal to other team members. However, the player may not autonomously select a signal sending position, so that it is impossible for the player to notify an exact gather place to the other team members.

Figure 1:
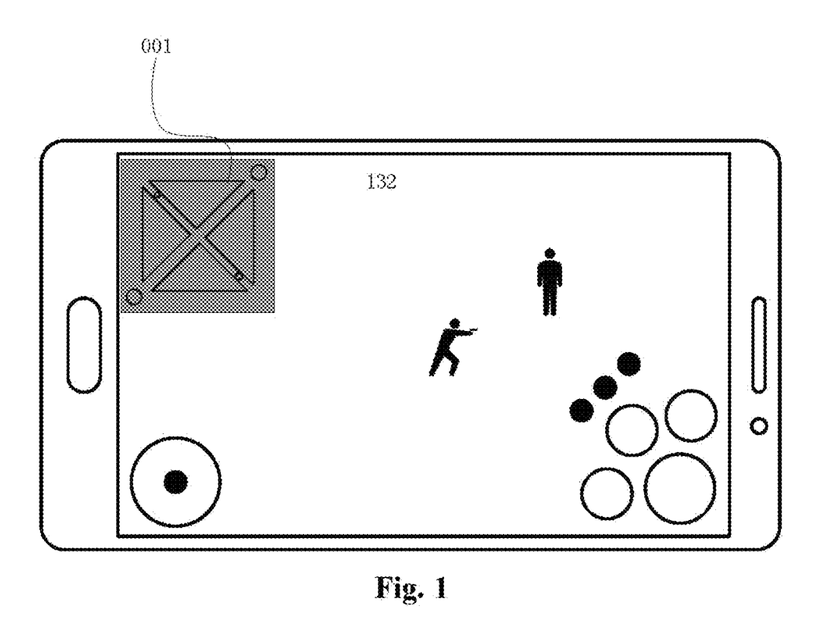
FIG. 1 is a schematic diagram of a game graphical user interface according to the related art.

At a third manner, FIG. 1 is a schematic diagram of a game graphical user interface according to the related art. As shown in FIG. 1, a click operation of a player over a mini-map (or called as a panoramic thumbnail of a game scene) 001 in a game interface is detected to trigger a preset signal. In such a manner, the player may be allowed to select position information in a prompt signal. However, the player may not select a type (such as, gather, attack and retreat) of the prompt signal, and the type of the prompt signal may be automatically selected according to an algorithm of a system, so that a selection result is likely to be inconsistent with a real intention of the player. In addition, a screen of a mobile phone is relatively small, so that a position may not be accurately selected from the mini-map in the game, and a mis-operation rate is high. Moreover, for avoiding a central region of the screen being occupied, the mini-map is usually arranged in a corner region of the screen, so that inconvenience is brought to operations of the player.

Figure 2:
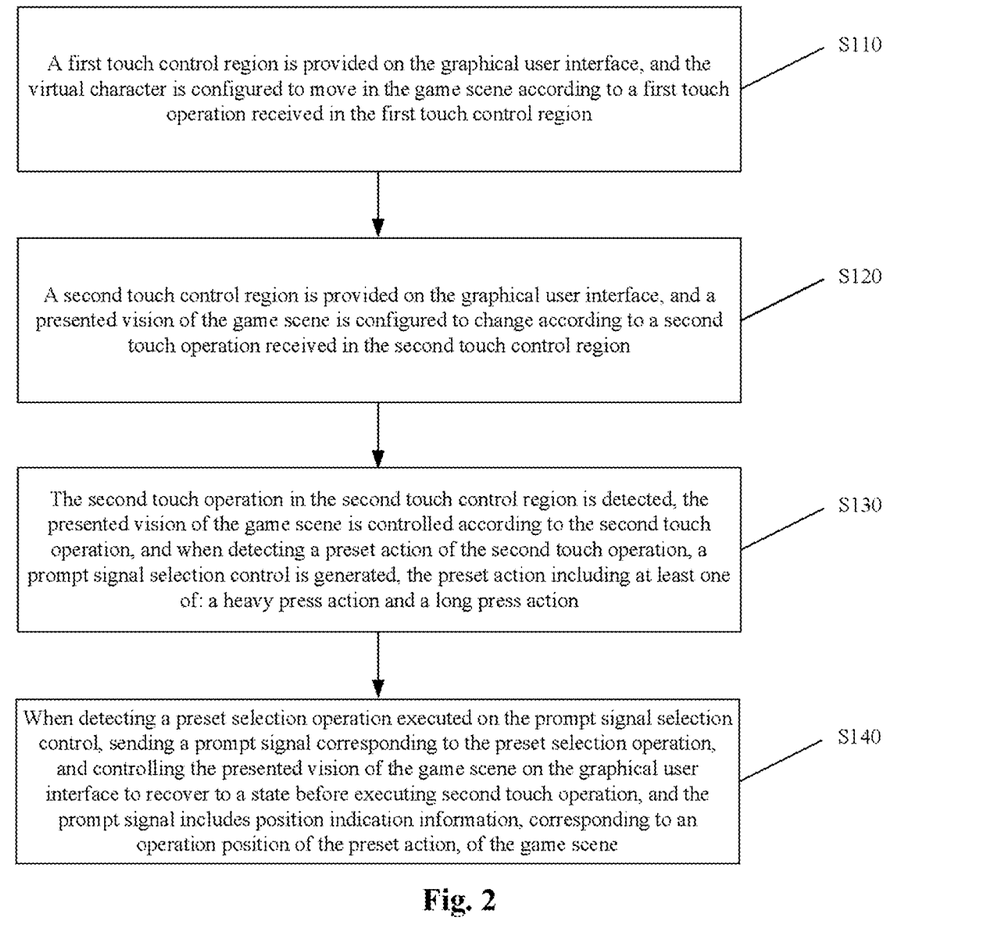
FIG. 2 is a flowchart of an information processing method according to an embodiment of the present disclosure.

In embodiment of the present disclosure, an information processing method is provided by executing a software application on a processor of a mobile terminal and performing rendering a graphical user interface on a touch screen of the mobile terminal. A content presented on the graphical user interface includes a game scene and at least partially includes a virtual character. FIG. 2 is a flowchart of an information processing method according to an embodiment of the present disclosure. The information processing method may include the following steps as shown in FIG. 2.

In Step S110, a first touch control region is provided on the graphical user interface, and the virtual character is configured to move in the game scene according to a first touch operation received in the first touch control region.

In Step S120, a second touch control region is provided on the graphical user interface, and a presented vision of the game scene is configured to change according to a second touch operation received in the second touch control region.

In Step S130, the second touch operation in the second touch control region is detected, the presented vision of the game scene is controlled according to the second touch operation, and when detecting a preset action of the second touch operation, a prompt signal selection control is generated, the preset action including at least one of: a heavy press action and a long press action.

In Step S140, when detecting a preset selection operation executed on the prompt signal selection control, sending a prompt signal corresponding to the preset selection operation, and controlling the presented vision of the game scene on the graphical user interface to recover to a state before executing second touch operation, and the prompt signal includes position indication information, corresponding to an operation position of the preset action, of the game scene.

The following purposes may be achieved by the information processing method provided in the embodiment. On one hand, the first touch control region is provided on the graphical user interface, movement may be performed in the game scene according to the detected first touch operation executed in the first touch control region. That is, the movement may be performed according to the first touch operation received in the first touch control region. On the other hand, the second touch control region is provided on the graphical user interface, the presented vision of the game scene on the graphical user interface may change according to the detected second touch operation executed in the second touch control region. That is, the presented vision of the game scene may change according to the second touch operation received in the second touch control region. And the presented vision of the game scene on the graphical user interface may change by the second touch operation of a user in the second touch control region, so that the user may autonomously select a position required to be observed in the game scene conveniently. In addition, the prompt signal is triggered on a basis of a specific action of the user at the same time when the user observes the position which is autonomously selected and to be observed in the game scene. And the prompt signal includes information about the position selected by the user in the game scene, so that the user may conveniently send at least one cooperation instruction of gathering at a specified position, attacking at the specified position and prompting a player to retreat from the specified position and the like to other players.

Each step of the game screen display control method provided in the embodiment will be further described below.

In Step S110, the first touch control region is provided on the graphical user interface, and the virtual character is configured to move in the game scene according to the first touch operation received in the first touch control region.

The first touch control region may be one of: a virtual joystick control region and a direction control virtual button region. There are no special limits made in the present disclosure.

In an optional implementation mode, the first touch control region is a virtual cross button region or a virtual direction button region. At least one of movement and rotation of the virtual character in the game scene is controlled according to the first touch operation received in the virtual cross button region.

In an optional embodiment, the first touch control region is a touch control region with a visual indication function. The first touch control region is one of: a touch control region with a bounding box, a touch control region filled with a color, a touch control region with predetermined transparency and other control regions capable of visually indicating a range of the first touch control region. At least one of movement and rotation of the virtual character in the game scene is controlled according to a touch operation, such as a slide operation or a click operation received in the touch control region. The touch control region with the visual indication function may enable the user to rapidly position the touch control region and may reduce difficulty in operation of a game novice.

In another optional embodiment, the first touch control region is a touch control region without the visual indication function on the graphical user interface. The touch control region without the visual indication function may not cover or influence the game screen, provide a better screen effect and save a screen space. However, the touch control region without the visual indication function is unlikely to perceive by a player. As an optional implementation solution, a visual guidance control may be displayed in the first touch control region. For example, when a virtual joystick is adopted as a direction control solution for the character, the virtual joystick may be displayed in the first touch control region for visual guidance to the player.

Figure 4:
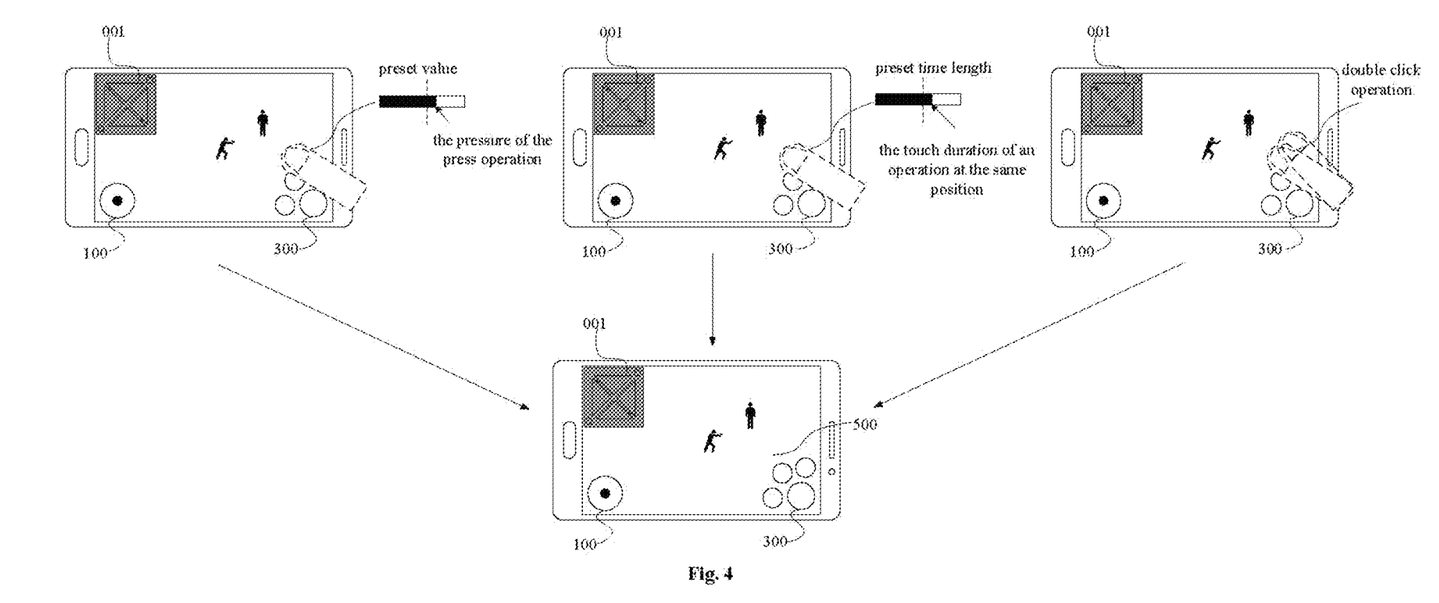
FIG. 4 is a schematic diagram of a graphical user interface according to an exemplary embodiment of the present disclosure.

FIG. 4 is a schematic diagram of a graphical user interface according to an exemplary embodiment of the present disclosure. As shown in FIG. 4, the first touch control region is a virtual joystick control region. The virtual joystick control region is located at a left lower part of the graphical user interface. A virtual joystick 100 is displayed in the virtual joystick control region as a default. The virtual character is controlled to move in the game scene according to the first touch operation received in the virtual joystick control region. Multiple skill controls 300 are provided at a right lower part of the graphical user interface, and are configured to provide a control function for releasing at least one skill for the player. Therefore, in the exemplary embodiment, the user may conveniently control the virtual character with the left hand to move in the game scene and control the skill controls with the right hand to release skills.

The first touch control region is provided on the graphical user interface, and the virtual character may be controlled to move in the game scene according to the detected first touch operation executed in the first touch control region.

In Step S120, the second touch control region is provided on the graphical user interface, and the presented vision of the game scene on the graphical user interface is configured to change according to the second touch operation received in the second touch control region.

In an optional embodiment, the second touch control region is a touch control region with the visual indication function on the graphical user interface. The touch control region may be one of: a touch control region with a bounding box, a touch control region filled with a color, a touch control region with predetermined transparency and other control regions capable of visually indicating a range of the second touch control region. The touch control region with the visual indication function may enable the user to rapidly position the touch control region and may reduce difficulty in operation of a game novice.

In another optional embodiment, the second touch control region is a touch control region without the visual indication function on the graphical user interface. The touch control region without the visual indication function may not cover or influence the game screen, provide a better screen effect and save a screen space. In the embodiment shown in FIG. 2, the second touch control region 500 is a touch control region without the visual indication function, and is arranged on a right side of the graphical user interface and located above the skill controls 300 to facilitate operation of the player.

A change in the presented vision of the game scene on the graphical user interface includes at least one of: a change in a presented range of the game scene on the graphical user interface and a change in a presented angle of the game scene on the graphical user interface.

In an exemplary embodiment, when the presented vision of the game scene on the graphical user interface is changed according to the second touch operation received in the second touch control region, at least one of an orientation of the virtual character and a position of a weapon crosshair may not change by the second touch operation.

Changing of the presented vision of the game scene on the graphical user interface will be described below in combination with an example.

Changing of the presented vision may refer to changing at least one of a position and angle of a virtual camera in the game scene through a touch trace of the second touch operation.

Figure 5:
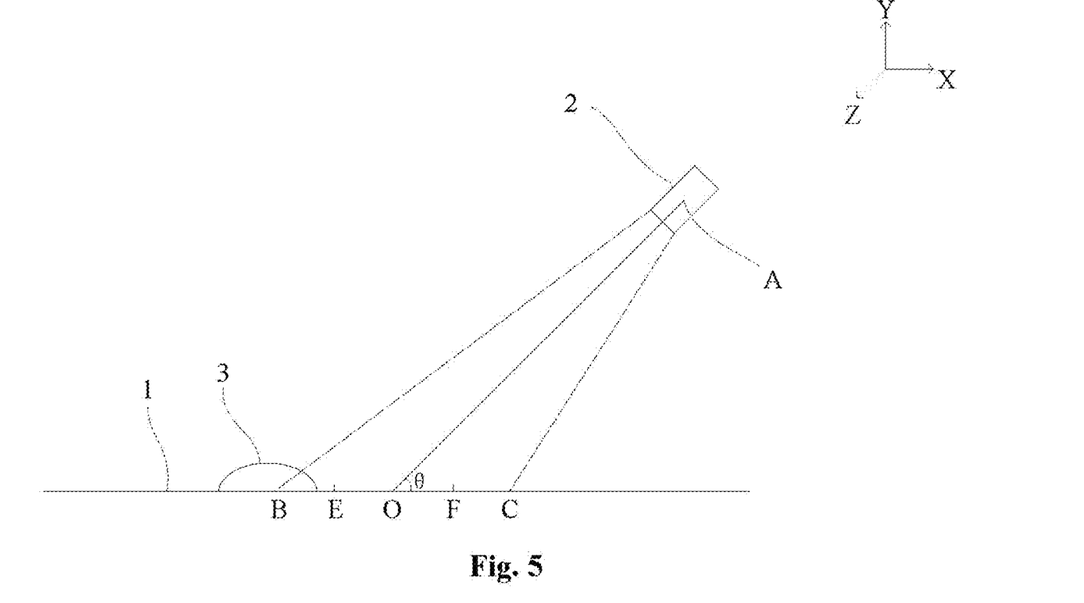
FIG. 5 is a schematic diagram of vision control over a game scene according to an exemplary embodiment of the present disclosure.

FIG. 5 is a schematic diagram of vision control over a game scene according to an exemplary embodiment of the present disclosure. As shown in FIG. 5, in an XY coordinate plane, a Z direction in the figure is an outward direction perpendicular to a principal plane (namely the XY plane). A reference sign 1 indicates a game scene, a reference sign 2 indicates a virtual camera, and a reference sign 3 indicates a hillside in the game scene. The virtual camera 2 is arranged at a point A, and an angle of a shooting direction line OA is θ. A point O is an intersection of the shooting direction line passing through the point A and a game scene 1. A content of a game scene rendered on a screen of the mobile terminal is equivalent to a scene content shot by the virtual camera 2. A shooting range of the virtual camera 2 is from a point B to a point C. When a relative height of the virtual camera 2 and the game scene 1 is changed, parameters, i.e., the included angle θ between the shooting direction line OA and the game scene 1, the position of the virtual camera, an orientation of the shooting direction line OA and the like, of the virtual camera 2 may all change the presented range of the game scene on the graphical user interface, namely changing the presented vision of the game scene.

Under the condition that the relative height of the virtual camera 2 and the game scene 1 is kept unchanged, the position of the virtual camera 2 is moved or the virtual camera is rotated with the angle θ kept unchanged, and a presented position of the game scene on the graphical user interface may change with a presented region of the game scene on the graphical user interface kept unchanged.

When the virtual camera 2 zooms in on the game scene 1 along the shooting direction line AO, the presented range of the game scene on the graphical user interface may be narrowed, and the presentation angle is kept unchanged. When the virtual camera 2 zooms out on the game scene 1 along the shooting direction line AO, the presented range may be enlarged, and the presentation angle is kept unchanged.

When the game scene is relatively small, for example, the range of the game scene is limited from a point E to a point F, in a certain shooting angle range, the virtual camera 2 may shoot the whole range of the game scene. Under this circumstance, the position of the virtual camera 2 is kept at the point A, the shooting angle θ is changed within a certain range, the presentation angle of the game scene on the graphical user interface may change, and the presented range is kept unchanged.

In an optional implementation mode, a precondition may be set for provision of the second touch operation. For example, when a preset touch operation on the graphical user interface is detected, the second touch control region is provided on the graphical user interface. For another example, when detecting a preset touch operation such as one of a heavy press operation, a long press and a double click operation on the graphical user interface, the second touch control region is provided on the graphical user interface. The presented vision of the game scene on the graphical user interface is configured to change according to the second touch operation received in the second touch control operation. In such a manner, the user may call the second touch control region according to a requirement, mis-operation may be avoided, and the screen space may further be saved.

In an optional implementation mode, an option is provided in settings of the game software application for the user to select, and whether to enable a function of providing the second touch control region on the graphical user interface or not is determined according to a content of the setting option.

It is important to note that a sequence of Step S110 and Step S120 is not limited.

Figure 3:
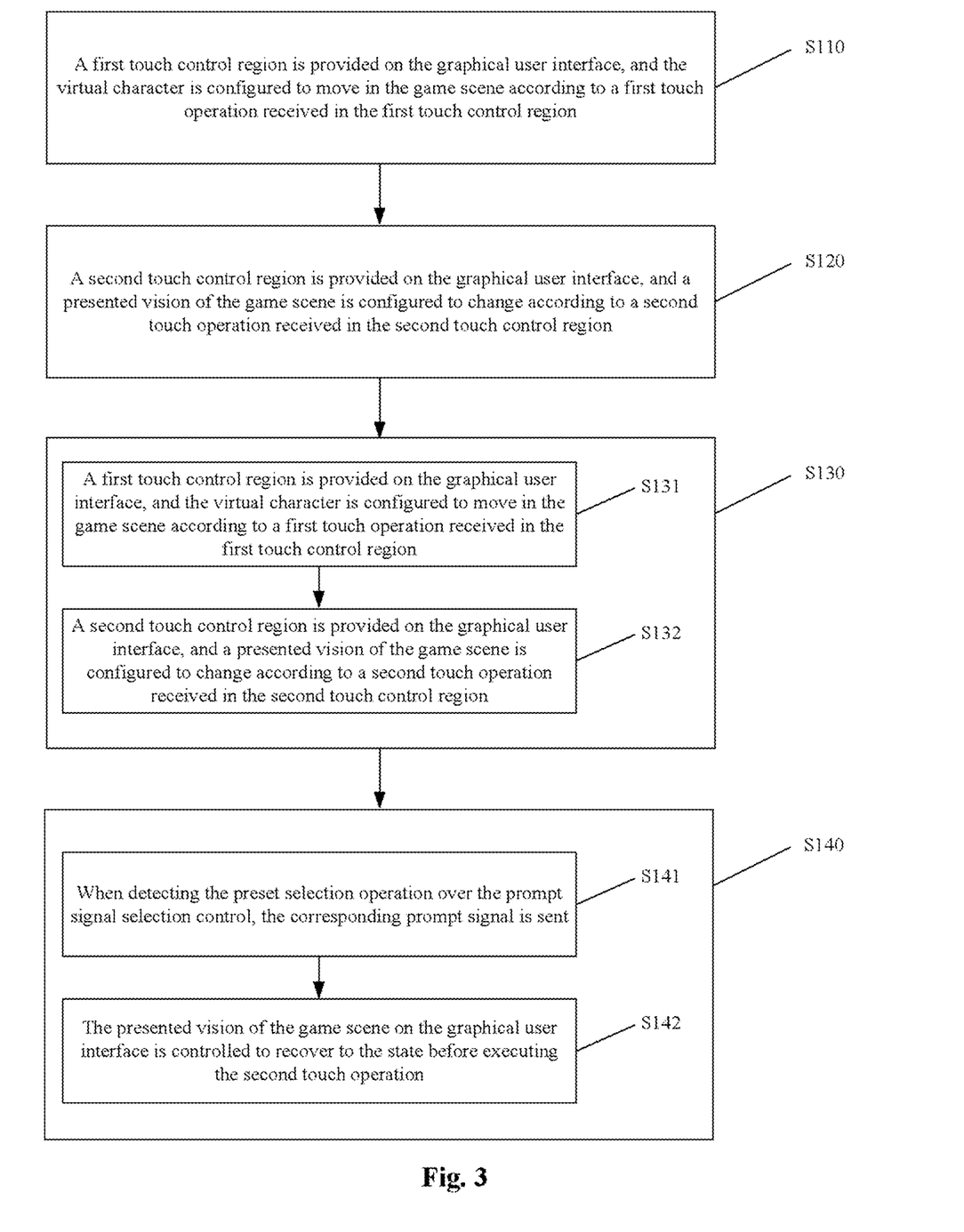
FIG. 3 is a flowchart of an information processing method according to an exemplary embodiment of the present disclosure.

In Step S130, the second touch operation in the second touch control region is detected, the presented vision of the game scene is controlled according to the second touch operation, and detecting when the preset action of the second touch operation, the prompt signal selection control is generated, the preset action including at least one of: the heavy press action and the long press action. FIG. 3 is a flowchart of an information processing method according to an exemplary embodiment of the present disclosure. For convenient elaboration, Step S130 is split into two parts for further respective description below as shown in FIG 3.

In Step S131, the second touch operation in the second touch control region is detected, and the presented vision of the game scene is controlled according to the second touch operation.

In an optional embodiment, the second touch operation includes a touch sliding operation. When detecting the touch sliding operation of the player\, the presented vision of the game scene on the graphical user interface is changed according to a sliding trace of the touch sliding operation.

In an optional embodiment, when the presented vision of the game scene is changed by the second touch operation, the position of the virtual character in the game scene may not change by the second touch operation.

Figure 6:
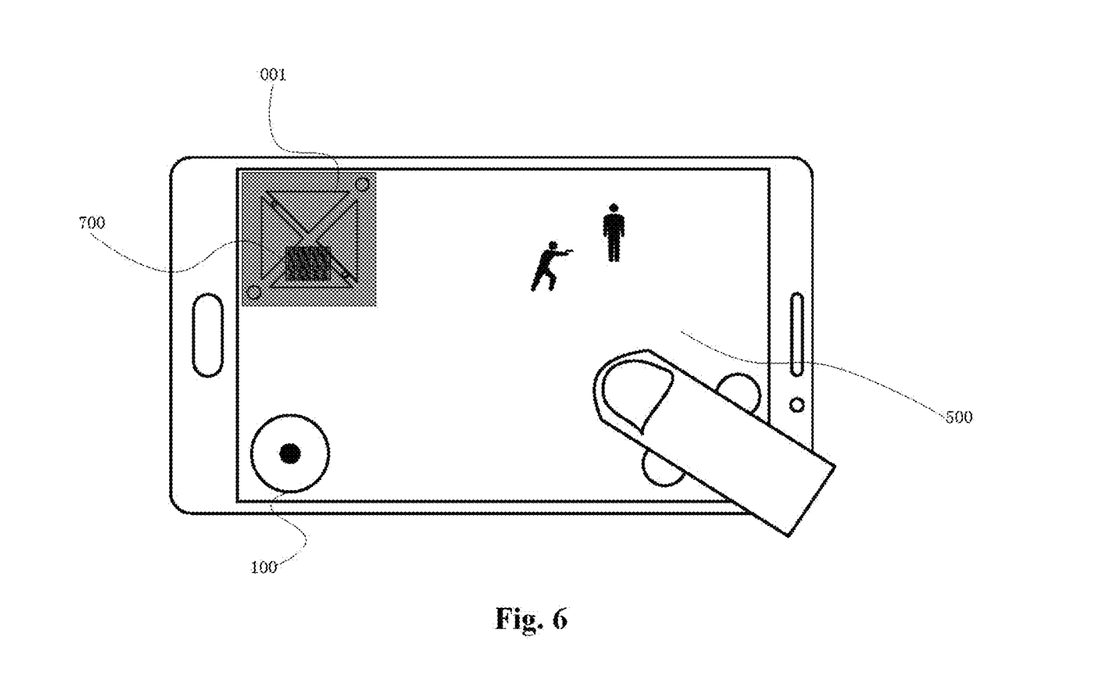
FIG. 6 is a schematic diagram (including a vision region identifier) of a graphical user interface according to an exemplary embodiment of the present disclosure.
Figure 7:
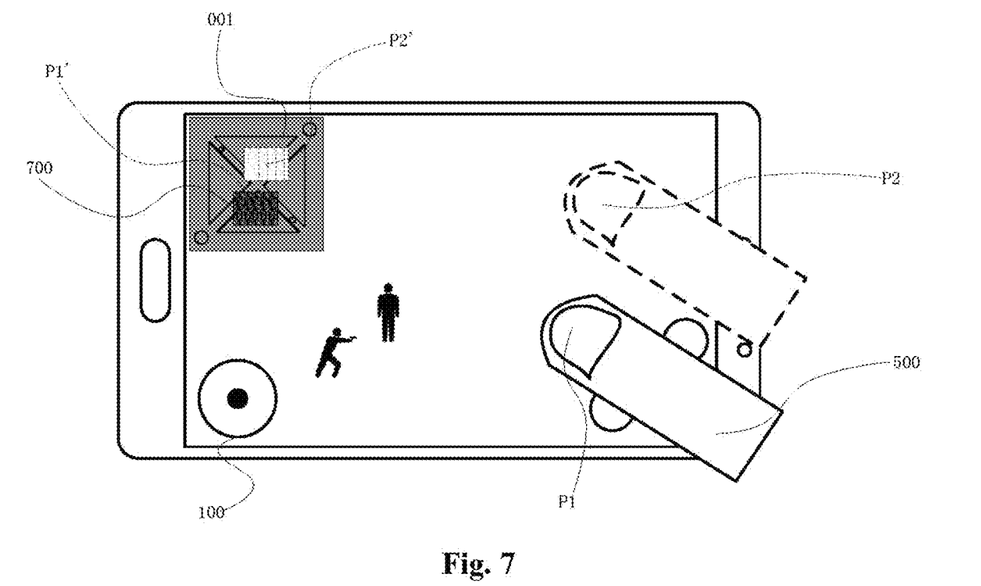
FIG. 7 is a schematic diagram of changing a presented vision based on a sliding operation according to an exemplary embodiment of the present disclosure.

FIG. 6 is a schematic diagram of a graphical user interface including a vision region identifier according to an exemplary embodiment of the present disclosure. In the embodiment shown in FIG. 6, a panoramic thumbnail 001 of the game scene is provided on the graphical user interface, and is configured to display a panoramic map of the game scene and important information in the game (for example, real-time positions of the other team members, real-time positions of enemy characters and present vision information of the game scene). The presented vision of the game scene on the graphical user interface is a local region of the game scene. In the embodiment, at least one of a position and region of the present presented vision in the game scene is identified in the panoramic thumbnail 001 of the game scene through a vision region identifier 700. During the game, the second touch operation of the player in the second touch control region 500 is detected to change the presented vision of the game scene. FIG. 7 is a schematic diagram of changing a presented vision based on a sliding operation according to an exemplary embodiment of the present disclosure. In the embodiment shown in FIG. 7, when a touch point of the player slides from a position P1 to position P2 in the second touch control region 500, the position of the presented vision of the game scene in the game scene is correspondingly updated from a P1' region to a P2' region.

In an optional embodiment, a height and shooting angle of the virtual camera 2 are fixed. The second touch operation received in the second touch control region acts to change the presented vision of the game scene through changing the position of the camera 2. Since the height and shooting angle of the virtual camera 2 are fixed, the virtual camera 2 equivalently moves on a fixed plane. Thus, the touch operation of the player in the second touch control region may be used for controlling movement of the virtual camera to further control the present presented vision. In the optional embodiment, a finger of the player slides up and down to control upward and downward movement of the present presented vision in the game scene and the finger of the player slides leftwards and rightwards to control leftward and rightward movement of the present presented vision in the game scene.

In Step S132, when detecting the preset action of the second touch operation, the prompt signal selection control is generated, the preset action including at least one of: the heavy press action and the long press action.

Figure 8A:
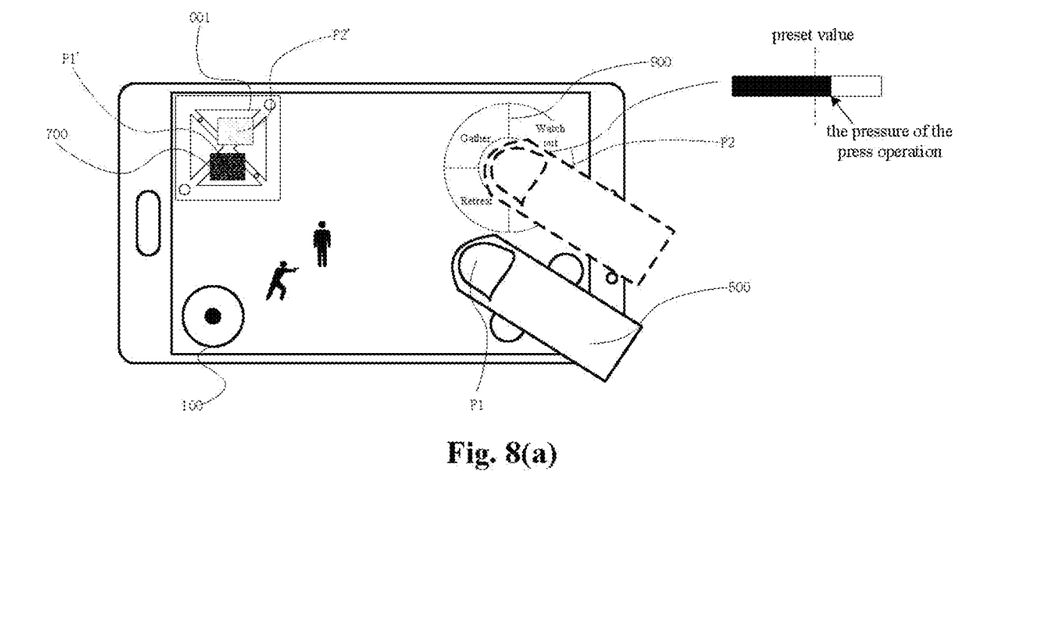
FIG. 8(a) is a schematic diagram of a graphical user interface of a state after generating a prompt signal selection control according to an exemplary embodiment of the present disclosure.
Figure 8B:
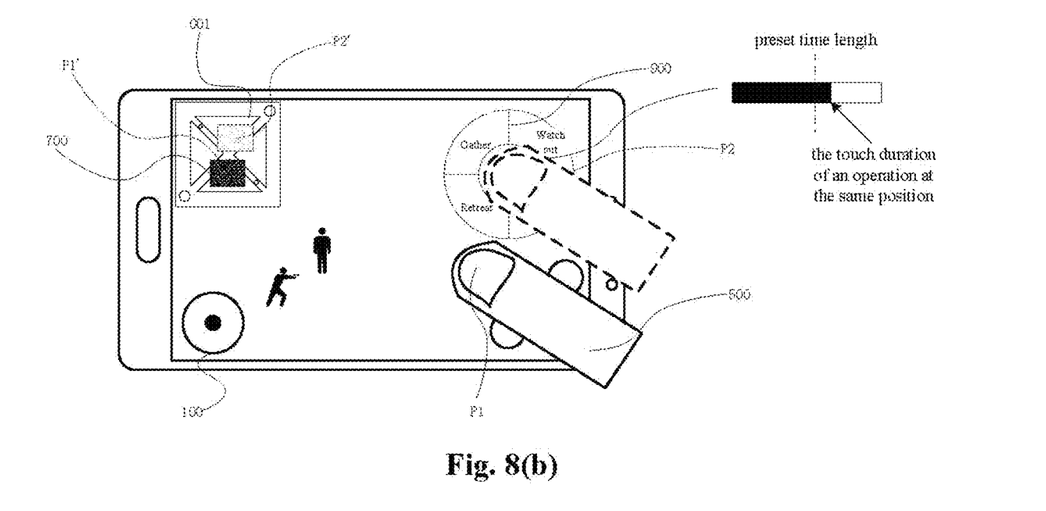
FIG. 8(b) is a schematic diagram of a graphical user interface of a state after generating a prompt signal selection control according to another exemplary embodiment of the present disclosure.
Figure 9:
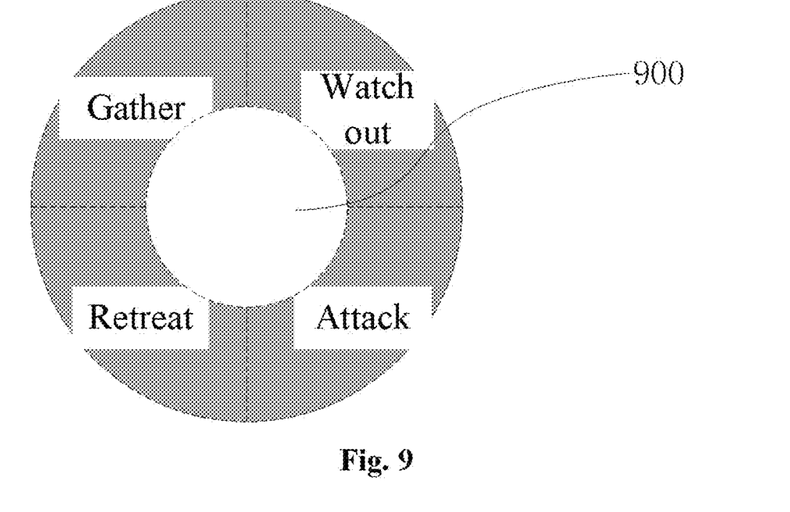
FIG. 9 is a schematic diagram of a prompt signal selection control according to an exemplary embodiment of the present disclosure.

FIG. 8(a) is a schematic diagram of a graphical user interface of a state after generating a prompt signal selection control according to an exemplary embodiment of the present disclosure. FIG. 8(b) is a schematic diagram of a graphical user interface of a state after generating a prompt signal selection control according to another exemplary embodiment of the present disclosure. In the embodiment shown in FIG. 8(a) and FIG. 8(b), in a process of detecting the second touch operation, an operation change of the second touch operation is monitored. If the preset action is detected, the prompt signal selection control 900 is generated. The signal selection control 900 further includes at least two sub-controls, and each sub-control is configured to send different preset instruction information. FIG. 9 is a schematic diagram of a prompt signal selection control according to an exemplary embodiment of the present disclosure. In the embodiment shown in FIG. 9, the signal selection control 900 includes four sub-controls, and preset instruction information corresponding to each sub-control may be set by a system as a default and may also provide a preset function preset by the player. For example, each of the four sub-controls respectively corresponds to preset instruction information of retreat, gather, attack and watch out.

The preset action configured to trigger the prompt signal selection control may be selected according to a type of a device (for example, a mobile phone) where the game runs, a specific type of the game and the like. For facilitating real-time control over the presented vision of the game scene, the presented vision is controlled by the touch sliding operation of the player under a normal circumstance. Therefore, for avoiding an operation conflict, the preset action triggering the prompt signal selection control adopts one of: the heavy press action, the long press action and simultaneous adoption of the heavy press and long press actions. The heavy press action refers to a press operation of which pressure is higher than a preset value. Detection of the heavy press action depends on a hardware function of the device (for example, a force touch function of iPhone, i.e., a pressure sensing function). If a touch screen of the device does not have a heavy press detection function, the long press action may be adopted as the preset action. The long press action refers to an operation of which touch duration at the same position exceeds a preset time length. The preset time length may be set according to a requirement and is not limited to specific time in the present disclosure.

For convenient understanding, referring to the embodiment shown in FIG. 8(a) and 8(b), when detecting the touch sliding operation (for example, movement from the position P1 to the position P2) in the second touch control region, the presented vision of the game scene is controlled to change in real time (for example, movement from the P1' region to the P2' region) according to the touch sliding operation. In this process, if detecting the heavy press or long press action (for example, heavy press or long press action executed by the player at the position P2), the prompt signal selection control 900 is generated. The operation position of the preset action is taken as a reference position of the signal selection control 90, thereby brining convenience to operation of the player. For example, the signal selection control 900 is generated at the position P2 or a range at a preset distance away from the position P2.

In an optional embodiment, after the preset action is detected to generate the prompt signal selection control 900, the presented vision of the game scene is stopped to be controlled and a prompt signal selection step is executed. For example, in the implementation mode shown in FIG. 8(a) and 8(b), after the prompt signal selection control 900 is generated, the presented vision of the game scene should stay in the P2' region.

In Step S140, when detecting the preset selection operation over the prompt signal selection control, the corresponding prompt signal is sent, and the presented vision of the game scene on the graphical user interface is controlled to recover to the state before executing the second touch operation. The prompt signal includes the position indication information, corresponding to the operation position of the preset action, of the game scene.

For convenient elaboration, Step S140 will be split into two parts, i.e., Step S141 and Step S142, below for further respective present disclosure.

In Step S141, when detecting the preset selection operation over the prompt signal selection control, the corresponding prompt signal is sent.

A purpose of the step is to send the corresponding prompt signal according to selection of the user over the prompt signal selection control. Therefore, the preset selection operation may be different according to different game types and a specific presentation manner of the signal selection control. The preset selection operation may be a click operation and may also be a sliding selection sending operation continuous with the second touch operation. The click operation refers to a click operation executed on the sub-control to be selected after the prompt signal selection control is generated and the finger of the player leaves the touch screen. The sliding selection sending operation refers to that the sub-control, where an ending position of a sliding touch operation is located, is taken as the selected sub-control. The expression of the sliding selection sending operation continuous with the second touch operation refers to that the finger of the player does not leave the screen between the second touch operation and the sliding selection sending operation. If contact between the finger of the player and the touch screen till the finger of the player leaves the touch screen is considered as an operation, the second touch operation and the sliding selection sending operation are different parts or stages of the same operation. Taking the click operation and the sliding selection sending operation continuous with the second touch operation as the preset selection operation may achieve different advantages. Since the click operation is independent of the second touch operation, the player may raise the finger to conveniently read information of different sub-controls, and mis-operation caused by the fact that the finger covers the information is avoided. The sliding selection sending operation continuous with the second touch operation has the advantage of continuity, and the player may implement the three parts of vision control, triggering of the prompt signal selection control and sub-control selection (i.e., signal sending) by a continuous operation, so that the advantages of efficiency and high speed are achieved, and interruption of a normal game behavior of the player may be minimized.

In an optional embodiment, the prompt signal has a function of prompting at least one other player in the game (for example, at least one other team member in a group game) to execute a specific operation. Therefore, sending the prompt signal may refer to sending the prompt signal to the at least one other team member through a game server, thereby displaying the corresponding signal in a graphical user interface of the game on the device, where the game runs, of the at least one other team member. Of course, the corresponding signal may also be sent in graphical user interfaces of the game of all team members or all players.

In an optional embodiment, the prompt signal includes the position indication information, corresponding to the operation position of the preset action, of the game scene. On one hand, the player may autonomously control the presented vision of the game scene through the second touch operation, so that another game scene region out of the present vision may be observed according to a requirement. On the other hand, the player may also select the position indication information included in the prompt signal through the second touch operation. The game scene corresponding to the operation position of the preset action refers to a game scene displayed in a screen region where the operation position of the preset action is located. And referring to the embodiment shown in FIG. 8(a) and 8(b), the game scene corresponding to the operation position of the preset action refers to a game scene displayed in a screen region where the position P2 is located. The position indication information of the scene is configured to help the player receiving the signal to understand the position indicated in the signal.

In an optional embodiment, a terminal of the player receiving the prompt signal identifies the corresponding position in the panoramic thumbnail of the game scene according to the indication information, so that the player may directly learn about the position indicated by the prompt signal through the visible identifier in the panoramic thumbnail of the game scene. The visible identifier is a dynamic special effect, for example, a flickering highlighting prompt.

In an optional embodiment, after sending the corresponding prompt signal, the local terminal may also identify the position of the game scene corresponding to the operation position of the preset action in the panoramic thumbnail of the game scene, thereby enabling the player to obtain a good operation feedback.

Besides the position indication information, the prompt signal may further include voice prompt indication information and text prompt indication information, or, a prompt voice, a prompt text and the like. For example, the prompt voice may be sent to the terminal of the other player (for example, when the user selects "gather" in FIG. 8(a) and 8(b), audio information "gather" of the voice prompt is sent to the terminal of the other player), and the voice prompt indication information may further be sent to the terminal of the other player, so as to indicate the terminal of the other player to play a corresponding voice audio which is pre-stored.

Figure 10:
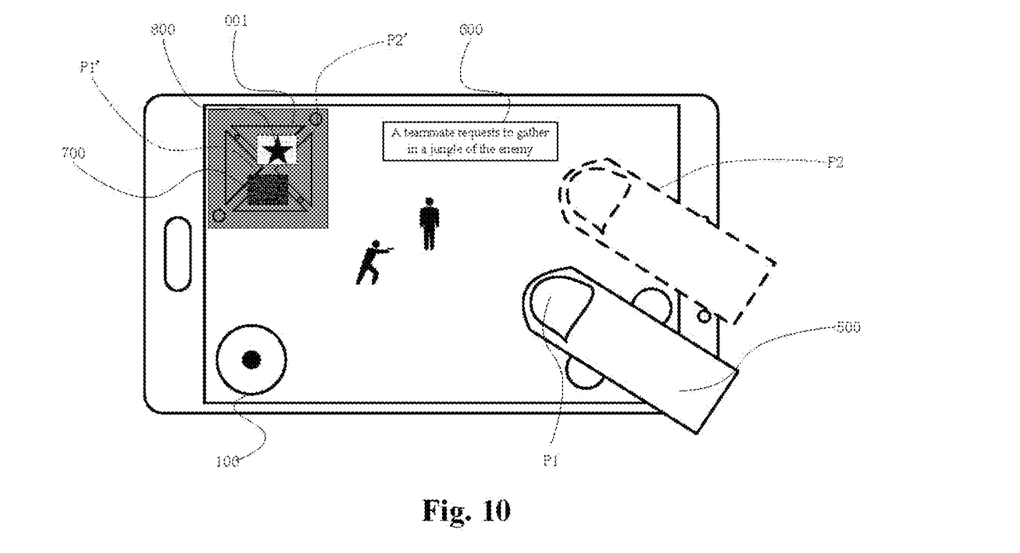
FIG. 10 is a schematic diagram of a graphical user interface of a state of a prompt signal receiving party after a prompt signal is sent to the prompt signal receiving party according to an exemplary embodiment of the present disclosure.

FIG. 10 is a schematic diagram of a graphical user interface of a state of a prompt signal receiving party after receiving a prompt signal according to an exemplary embodiment of the present disclosure. In the embodiment shown in FIG. 10, after the player selects a gather signal sub-control at the position P2, the following prompt information may appear in the graphical user interface of the game of the prompt signal receiving party (for example, the other team member). At a first prompt, a five-pointed star 800 displayed in the panoramic thumbnail of the game scene as the position indication information is configured to prompt the other team members to gather at this position. A second prompt, the other team members are prompted through a voice to gather at a specified position, for example, a voice "the other team members request to gather in a field of the enemy" is sent. A third prompt, the other team members are prompted through the text prompt information 600 to gather at the specified position, for example, a text "the other team members request to gather in the enemy jungle" is sent.

In Step S142, the presented vision of the game scene on the graphical user interface is controlled to recover to the state before executing the second touch operation.

The presented vision of the game scene on the graphical user interface is controlled to recover to the state before executing the second touch operation in one of the following manners.

At a first manner, the presented vision of the game scene on the graphical user interface is controlled to recover to a presented vision before executing the second touch operation.

At a second manner: the presented vision of the game scene on the graphical user interface is controlled to recover to a presented vision obtained according to calculation logic for the presented vision before executing the second touch operation.

The manner of controlling the presented vision of the game scene on the graphical user interface to recover to the presented vision before executing the second touch operation refers to that the presented vision range is absolutely recovered into the state before executing of the second touch operation. Both of an absolute position of the virtual camera of the game screen and one of an absolute angle and an absolute direction are recovered into the state before executing the second touch operation. For example, before executing the second touch operation, the position of the virtual camera 2 is the point A in an absolute coordinate of the game scene and the shooting direction is the direction vector AO. At this time, for absolute recovering the presented vision range into the state before executing the second touch operation on the basis of the point A and the direction vector AO, absolute recovery is implemented on the basis of the point A and the direction AO. That is, the presented vision of the game scene on the graphical user interface is controlled on the basis of the position of the virtual camera in the absolute coordinate of the game scene and the shooting direction in the absolute coordinate before executing the second touch operation.

The manner of controlling the presented vision of the game scene on the graphical user interface to recover to the presented vision obtained according to the calculation logic for the presented vision before executing the second touch operation refers to recovering the vision into a control state before executing the second touch operation. For example, before executing the second touch operation, the presented vision of the game is obtained according to a pre-determined calculation logic. For example, the virtual camera is arranged at the head of the virtual character and rotates along with rotation of the head of the virtual character. Under such a circumstance, the presented vision is recovered into the presented vision obtained by adopting the calculation logic before executing the second touch operation. For example, before the second touch operation, the position of the virtual camera 2 is the point A in a relative coordinate associated with the virtual character. For example, the point A is a point located behind the virtual character, forming a distance W with the virtual character and forming a height H between the point A and a ground of the game scene. The shooting direction is the direction vector AO, and the direction vector AO is associated with at least one of an orientation of the virtual character and a direction of the weapon crosshair. For example, a projection of the direction vector AO in a horizontal direction is the same as the orientation of the virtual character in the horizontal direction. During recovery, the position of the virtual camera 2 is still at the point A, and the shooting direction of the virtual camera 2 is associated with at least one of the orientation of the virtual character and the direction of the weapon crosshair. That is, the presented vision of the game scene on the graphical user interface is controlled on the basis of the present position of the virtual character in the absolute coordinate of the game scene, at least one of the present orientation of the virtual character and the direction of the weapon crosshair of the virtual character, a position relationship between the virtual camera in the game scene and the virtual character before executing the second touch operation and an association relationship between at least one of the orientation of the virtual character and the direction of the weapon crosshair of the virtual character and the shooting direction of the virtual camera before executing the second touch operation.

In an optional implementation mode, when the presented vision of the game scene is changed through the second touch control region, movement of the virtual character may change through the first touch control region. That is, movement of the virtual character may be controlled through the first touch operation in the first touch control region at the same time of changing the presented vision to observe an enemy situation through a touch control operation in the second touch control region.

In an optional implementation mode, when detecting the second touch operation \ to end, the presented vision of the game scene on the graphical user interface is controlled to recover to the state before executing the second touch operation. That is, if the second touch operation ends when the preset action does not appear to trigger the prompt signal selection control, the presented vision of the game scene on the graphical user interface is controlled to recover to the state at the end of executing the second touch operation. Ending of executing the second touch operation may refer to that the player stops the touch operation (for example, a touch medium leaves the screen) or the touch position of the player leaves the second touch control region, which is not limited in the present disclosure.

It is important to note that the drawings are schematic descriptions about processing included in the method according to the exemplary embodiments of the present disclosure and are not intended for limitation. It is easy to understand that processing shown in the drawings does not indicate or limit a time sequence for the processing. In addition, it is also easy to understand that the processing may be synchronously or asynchronously executed in, for example, multiple components.

Figure 11:
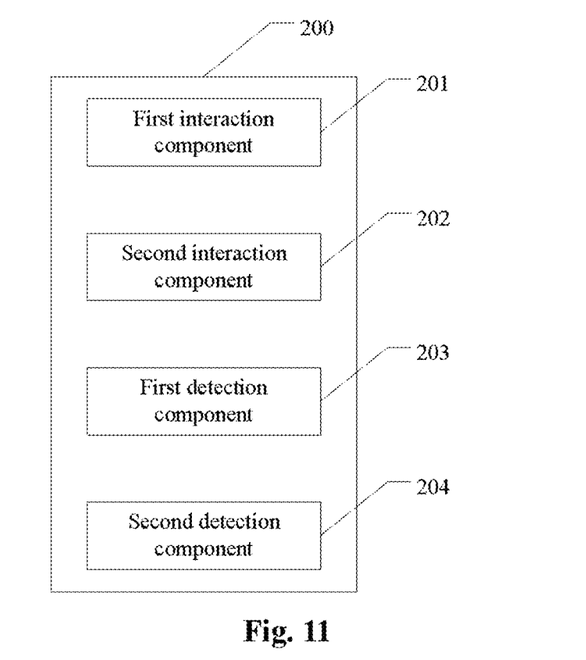
FIG. 11 is a structural block diagram of a game screen display control apparatus according to an exemplary embodiment of the present disclosure.

In another embodiment of the present disclosure, a game screen display control apparatus is further provided. FIG. 11 is a structural block diagram of a game screen display control apparatus according to an exemplary embodiment of the present disclosure. As shown in FIG. 11, the game screen display control apparatus is provided by executing a software application on a processor of a mobile terminal and performing rendering a graphical user interface on a touch screen of the mobile terminal, and a content presented on the graphical user interface including a game scene and at least partially including a virtual character. The game screen display control apparatus 200 may include: a first interaction component 201, a second interaction component 202, a first detection component 203 and a second detection component 204.

The first interaction component, arranged to provide a first touch control region on the graphical user interface and configure the virtual character to move in the game scene according to a first touch operation received in the first touch control region.

The second interaction component, arranged to provide a second touch control region on the graphical user interface and configure a presented vision of the game scene to change according to a second touch operation received in the second touch control region.

The first detection component, arranged to detect the second touch operation in the second touch control region, control the presented vision of the game scene according to the second touch operation, and when detecting a preset action of the second touch operation, generate a prompt signal selection control, the preset action comprising at least one of: a heavy press action and a long press action.

A second detection component, arranged to, when detecting a preset selection operation executed on the prompt signal selection control, send a prompt signal corresponding to the preset selection operation, and control the presented vision of the game scene on the graphical user interface to recover to a state before executing second touch operation, and the prompt signal comprises position indication information, corresponding to an operation position of the preset action, of the game scene.

Specific details about each component of the game screen display control apparatus have been described in the corresponding information processing method in detail and thus will not be elaborated herein.

It is important to note that, although a plurality of components or units of devices configured for action execution are mentioned in the above detailed descriptions, such division is optional. Actually, characteristics and functions of two or more components or units described above may be embodied in one component or unit according to the implementation modes of the present disclosure. On the contrary, the characteristics and functions of the one component or unit described above may further be divided into multiple components or units for embodying.

In an exemplary embodiment of the present disclosure, a computer-readable storage medium is further provided, on which a computer program is stored, the computer program being executed by a processor to implement the abovementioned information processing method.

The computer-readable storage medium may include a data signal in a baseband or propagated as a part of a carrier, and a readable program code is born therein. The propagated data signal may adopt multiple forms, including, but not limited to, an electromagnetic signal, an optical signal or any appropriate combination thereof. The computer-readable storage medium may send, propagate or transmit a program configured to be used by or in combination with an instruction execution system, apparatus or device.

The program code included in the computer-readable storage medium may be transmitted with any appropriate medium, including, but not limited to, a wireless medium, a wired medium, an optical cable, a radio frequency and the like or any appropriate combination thereof.

Figure 12:
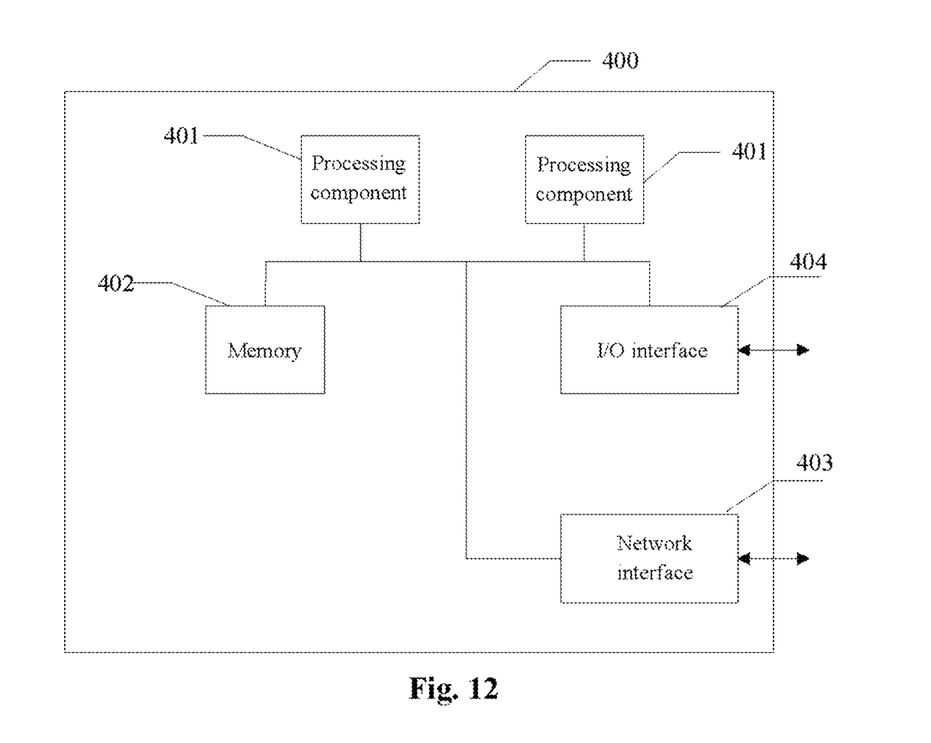
FIG. 12 is a structural schematic diagram of an electronic device according to an exemplary embodiment of the present disclosure.

In another embodiment of the present disclosure, an electronic device is further provided. FIG. 12 is a structural schematic diagram of an electronic device according to an exemplary embodiment of the present disclosure. As shown in FIG. 12, the electronic device 400 includes: a processing component 401, which may further include at least one processor, and a memory resource represented by a memory 402, which is configured to store instructions executable for the processing component 401, for example, application programs. The application programs stored in the memory 402 may include at least one component of which each corresponds to a set of instructions. In addition, the processing component 401 is configured to execute the instructions to execute the abovementioned information processing method.

The electronic device 400 may further include: a power component (not shown in the figure), a wired or wireless network interface 403 and an Input/Output (I/O) interface 404. The power component is configured to execute power management on the electronic device 400. The wired or wireless network interface 403 is configured to connect the electronic device 400 to a network. The electronic device 400 may be operated on the basis of an operating system stored in the memory, for example, Android, iOS, Windows Server™, Mac OS X™, Unix™, Linux™ and FreeBSD™.

From the above descriptions about the implementation modes, it is easy for those skilled in the art to understand that the exemplary implementation modes described herein may be implemented through software and may also be implemented in a manner of combining the software and necessary hardware. Therefore, the technical solutions according to the implementation modes of the present disclosure may be embodied in form of software product, and the software product may be stored in a nonvolatile storage medium (which may be a Compact Disc Read-Only Memory (CD-ROM), a U disk, a mobile hard disk and the like) or a network, including a plurality of instructions to enable a computing device (which may be a personal computer, a server, an electronic device, network device or the like) to execute the method according to the implementation modes of the present disclosure.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is limited by the appended claims.

What is claimed is:

1. An information processing method, provided by executing a software application on a processor of a mobile terminal and performing rendering a graphical user interface on a touch screen of the mobile terminal, and a content presented on the graphical user interface comprising a game scene and at least partially comprising a virtual character, the method comprising:

providing a first touch control region on the graphical user interface, and configuring the virtual character to move in the game scene according to a first touch operation received in the first touch control region;

providing a second touch control region on the graphical user interface, and configuring a presented vision of the game scene to change according to a second touch operation received in the second touch control region;

detecting the second touch operation in the second touch control region, controlling the presented vision of the game scene according to the second touch operation, and when detecting a preset action of the second touch operation, generating a prompt signal selection control, the preset action comprising at least one of: a heavy press action and a long press action; and when detecting a preset selection operation executed on the prompt signal selection control, sending a prompt signal corresponding to the preset selection operation, and controlling the presented vision of the game scene on the graphical user interface to recover to a state before executing second touch operation, wherein the prompt signal comprises position indication information, corresponding to an operation position of the preset action, of the game scene;

wherein the content presented on the graphical user interface further comprises a panoramic thumbnail of the game scene, and after sending the prompt signal, the method further comprises: identifying a position, corresponding to a operation position of the preset action, of the game scene in the panoramic thumbnail of the game scene.

2. The information processing method as claimed in claim 1, wherein the content presented on the graphical user interface further comprises a panoramic thumbnail of the game scene, and the method further comprises:

when receiving the prompt signal sent by another terminal, identifying a position indicated by the position indication information in the panoramic thumbnail of the game scene.

3. The information processing method as claimed in claim 1, wherein the prompt signal further comprises voice prompt information.

4. The information processing method as claimed in claim 1, wherein the prompt signal selection control comprises at least two sub-controls, each sub-control is respectively configured to send different preset instruction information, and the prompt signal further comprises the preset instruction information.

5. The information processing method as claimed in claim 4, wherein the preset selection operation comprises one of the following:

a click operation; and, a sliding selection sending operation continuous with the second touch operation, and the sliding selection sending operation refers to that a sub-control where an ending position of a sliding touch operation is located is taken as a selected sub-control.

6. The information processing method as claimed in claim 1, wherein the first touch control region is one of a virtual joystick control region and a direction control virtual button region.

7. The information processing method as claimed in claim 1, wherein the second touch operation comprises a touch sliding operation.

8. The information processing method as claimed in claim 1, wherein controlling the presented vision of the game scene according to the second touch operation comprises:

changing at least one of a position and angle of a virtual camera in the game scene according to a touch trace of the second touch operation.

9. The information processing method as claimed in claim 8, wherein the preset touch operation comprises any one of the following: heavy press operation, long press operation and double click operation.

10. The information processing method as claimed in claim 1, wherein providing the second touch control region on the graphical user interface comprises:

when detecting a preset touch operation on the graphical user interface, providing the second touch control region on the graphical user interface.

11. The information processing method as claimed in claim 1, wherein controlling the presented vision of the game scene on the graphical user interface to recover to the state before executing the second touch operation comprises one of the following:

controlling the presented vision of the game scene on the graphical user interface to recover to a presented vision before executing the second touch operation; and controlling the presented vision of the game scene on the graphical user interface to recover to a presented vision calculated according to a presented vision calculation logic before executing the second touch operation.

12. The information processing method as claimed in claim 1, wherein the heavy press action is a press operation of which pressure is higher than a preset value.

13. The information processing method as claimed in claim 1, wherein the long press action is an operation of which touch duration at the same position exceeds a preset time length.

14. The information processing method as claimed in claim 1, wherein the first touch control region is a touch control region with a visual indication function on the graphical user interface or a touch control region without the visual indication function on the graphical user interface.

15. The information processing method as claimed in claim 1, wherein the prompt signal further comprises: voice prompt indication information and text prompt indication information.

16. The information processing method as claimed in claim 1, wherein the second touch control region is a touch control region with the visual indication function on the graphical user interface.

17. A non-transitory computer-readable storage medium, on which a computer program is stored, the computer program being executed by a processor, wherein the computer program comprising:

providing a first touch control region on the graphical user interface, and configuring the virtual character to move in the game scene according to a first touch operation received in the first touch control region;

providing a second touch control region on the graphical user interface, and configuring a presented vision of the game scene to change according to a second touch operation received in the second touch control region;

detecting the second touch operation in the second touch control region, controlling the presented vision of the game scene according to the second touch operation, and when detecting a preset action of the second touch operation, generating a prompt signal selection control, the preset action comprising at least one of: a heavy press action and a long press action; and when detecting a preset selection operation executed on the prompt signal selection control, sending a prompt signal corresponding to the preset selection operation, and controlling the presented vision of the game scene on the graphical user interface to recover to a state before executing second touch operation, wherein the prompt signal comprises position indication information, corresponding to an operation position of the preset action, of the game scene;

wherein the content presented on the graphical user interface further comprises a panoramic thumbnail of the game scene, and after sending the prompt signal, the method further comprises: identifying a position, corresponding to a operation position of the preset action, of the game scene in the panoramic thumbnail of the game scene.

18. An electronic device, comprising:

a processor; and a memory, connected with the processor and arranged to store at least one instruction executed by the processor, wherein the processor is arranged to execute the at least one instruction, the at least one instruction comprising:

providing a first touch control region on the graphical user interface, and configuring the virtual character to move in the game scene according to a first touch operation received in the first touch control region;

providing a second touch control region on the graphical user interface, and configuring a presented vision of the game scene to change according to a second touch operation received in the second touch control region;

detecting the second touch operation in the second touch control region, controlling the presented vision of the game scene according to the second touch operation, and when detecting a preset action of the second touch operation, generating a prompt signal selection control, the preset action comprising at least one of: a heavy press action and a long press action; and when detecting a preset selection operation executed on the prompt signal selection control, sending a prompt signal corresponding to the preset selection operation, and controlling the presented vision of the game scene on the graphical user interface to recover to a state before executing second touch operation, wherein the prompt signal comprises position indication information, corresponding to an operation position of the preset action, of the game scene;

wherein the content presented on the graphical user interface further comprises a panoramic thumbnail of the game scene and after sending the prompt signal, the method further comprises: identifying a position, corresponding to a operation position of the preset action, of the game scene in the panoramic thumbnail of the game scene.

* * * * *